(12) United States Patent
Sakai et al.

(10) Patent No.: US 12,371,532 B2
(45) Date of Patent: Jul. 29, 2025

(54) POLYIMIDE RESIN COMPOSITION

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 711 days.

(21) Appl. No.: 17/435,176

(22) PCT Filed: Feb. 13, 2020

(86) PCT No.: PCT/JP2020/005507
§ 371 (c)(1),
(2) Date: Aug. 31, 2021

(87) PCT Pub. No.: WO2020/179391
PCT Pub. Date: Sep. 10, 2020

(65) Prior Publication Data
US 2022/0145010 A1    May 12, 2022

(30) Foreign Application Priority Data
Mar. 7, 2019  (JP) ................. 2019-041764

(51) Int. Cl.
*C08G 73/10*  (2006.01)
*C08K 3/04*  (2006.01)

(52) U.S. Cl.
CPC .......... *C08G 73/1082* (2013.01); *C08K 3/042* (2017.05)

(58) Field of Classification Search
CPC ............ C08G 73/1082; C08G 73/1017; C08G 73/1042; C08K 3/042; C08K 3/044; C08K 3/045; C08K 3/041; C08K 2201/011; C08L 79/08
See application file for complete search history.

(56) References Cited

U.S. PATENT DOCUMENTS

| 10,566,482 | B2 * | 2/2020 | Zhamu ................. H01L 31/052 |
| 2009/0093581 | A1 | 4/2009 | Swei et al. |
| 2012/0328785 | A1 | 12/2012 | Ha et al. |
| 2016/0177062 | A1 * | 6/2016 | Sato ....................... C08K 3/346 524/451 |
| 2017/0130003 | A1 * | 5/2017 | Sato .................... C08G 73/1082 |
| 2017/0275425 | A1 | 9/2017 | Sato |
| 2018/0230330 | A1 * | 8/2018 | Saijo ..................... C09D 179/08 |
| 2019/0047325 | A1 * | 2/2019 | Tsou ....................... C08L 51/08 |
| 2019/0345345 | A1 * | 11/2019 | Meng .................... C09D 149/00 |
| 2020/0075937 | A1 * | 3/2020 | Konishi ................. H01M 4/139 |

FOREIGN PATENT DOCUMENTS

| CN | 103589152 A | 2/2014 |
| CN | 105392842 A | 3/2016 |
| CN | 106536598 A | 3/2017 |
| CN | 106715534 A | 5/2017 |
| CN | 107325483 A | 11/2017 |
| CN | 108410169 A | 8/2018 |
| JP | 2004-346143 A | 12/2004 |
| JP | 2005-28524 A | 2/2005 |
| KR | 10-2015-0004097 A | 1/2015 |

(Continued)

OTHER PUBLICATIONS

Kim, KR-20150004097 (Year: 2015).*
Ok, KR101926371-MT (Year: 2018).*
International Search Report issued on Apr. 21, 2020 in PCT/JP2020/005507 filed on Feb. 13, 2020, citing documents AA-AC and AO-AQ therein, 2 pages.

*Primary Examiner* — Robert S Jones, Jr.
*Assistant Examiner* — Zhen Liu
(74) *Attorney, Agent, or Firm* — Oblon, McClelland, Maier & Neustadt, L.L.P.

(57) ABSTRACT

A polyimide resin composition containing a polyimide resin (A) and a nanocarbon material (B), wherein the polyimide resin (A) contains a repeating structural unit represented by the following formula (1) and a repeating structural unit represented by the following formula (2), and a content ratio of the repeating structural unit of the formula (1) with respect to the total of the repeating structural unit of the formula (1) and the repeating structural unit of the formula (2) is 20 to 70 mol %: wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic group.

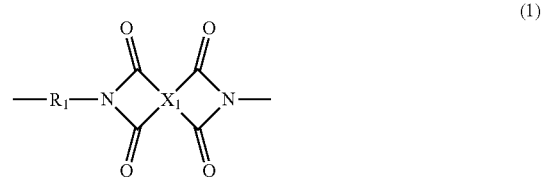

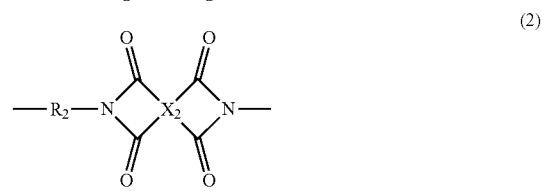

10 Claims, No Drawings

(56) References Cited

FOREIGN PATENT DOCUMENTS

| | | | | |
|---|---|---|---|---|
| KR | 20150004097 A | * | 11/2015 | ......... C08G 73/1039 |
| KR | 101926371 B1 | * | 12/2018 | |
| TW | 1450915 B | | 9/2014 | |
| WO | WO 2013/151215 A1 | | 10/2013 | |
| WO | WO 2015/020020 A1 | | 2/2015 | |
| WO | WO 2016/147997 A1 | | 9/2016 | |

* cited by examiner

POLYIMIDE RESIN COMPOSITION

CROSS-REFERENCE TO RELATED APPLICATIONS

The present application is a 35 U.S.C. § 371 national stage application of International patent application PCT/JP2020/005507, filed Feb. 13, 2020, which is based on and claims the benefit of priority to Japanese Application No. 2019-041764, filed Mar. 7, 2019. The entire contents of these applications are incorporated herein by reference.

TECHNICAL FIELD

The present invention relates to a polyimide resin composition.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding processability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

Further recently, addition of a carbon material to the thermoplastic polyimide resin to thereby provide a novel effect has been contemplated.

For example, PTL 2 discloses a thermoplastic polyimide resin composition comprising a thermoplastic polyimide resin and carbon nanotubes having a particular outer diameter and a particular aspect ratio. PTL 2 additionally mentions that a conductive plastic film having antistaticity and heat resistance of 200° C. or more can be provided according to the thermoplastic polyimide resin composition disclosed in PTL 2.

CITATION LIST

Patent Literature

PTL 1: JP-A-2005-28524
PTL 2: JP-A-2004-346143

SUMMARY OF INVENTION

Technical Problem

In PTL 2, however, the change in dimension after standing for a period as short as 2 hours in a constant temperature oven at 200° C. is evaluated, but long-term heat resistance after standing for a period as long as several days is not contemplated. For this reason, further contemplation is required for long-term heat resistance intended for use under a severer environment.

Further, in PTL 2, the tint, hue and the like of a conductive plastic film prepared using the thermoplastic polyimide resin composition have not been especially contemplated.

Recently, when a polyimide resin composition is used to form a molded article, high blackness may be required from the molded article from the viewpoint of designability, in addition to the long-term heat resistance.

When a molded article has high blackness, an effect of projecting a high quality sense, an effect of representing jet-blackness having a texture and transparency, and the like can be expected.

Examples of a molded article required to have high blackness include enclosures for electric appliances including mobile phones, liquid crystal televisions, speakers, game machines, and notebook computers; interior members for automobiles including interior panels, door handles, steering, car audio, and car navigation frames; exterior members for automobiles including roof spoilers and window garnishes; members for use in furniture; and members for use in musical instruments.

Thus, an object of the present invention is to provide a molded article having excellent long-term heat resistance and high blackness and a polyimide resin composition from which the molded article can be provided.

Solution to Problem

The present inventors have found that the aforementioned object can be attained by a polyimide resin composition containing a polyimide resin (A) containing particular different polyimide structural units combined at a particular ratio and a nanocarbon material (B).

That is, the present invention provides a polyimide resin composition containing a polyimide resin (A) and a nanocarbon material (B), wherein the polyimide resin (A) contains a repeating structural unit represented by the following formula (1) and a repeating structural unit represented by the following formula (2), and a content ratio of the repeating structural unit of the formula (1) with respect to the total of the repeating structural unit of the formula (1) and the repeating structural unit of the formula (2) is 20 to 70 mol %:

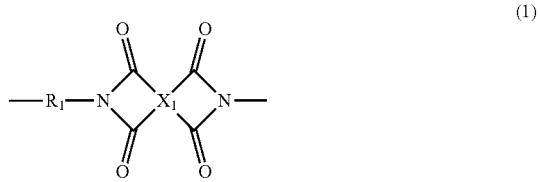

(1)

3
-continued

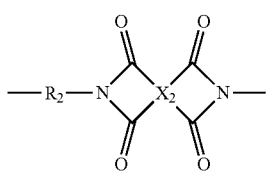
(2)

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic group.

Advantageous Effects of Invention

According to the polyimide resin composition of the present invention, a molded article having excellent long-term heat resistance and high blackness can be provided. The molded article of the present invention can be applied, for example, in various industrial members, members for household electrical products such as gears, bearings, and belts, covering materials for electrical wire and the like, cover-lay films, aviation applications, enclosures for electric appliances, interior members for automobiles, exterior members for automobiles, members for use in furniture, and members for use in musical instruments.

DESCRIPTION OF EMBODIMENTS

[Polyimide Resin Composition]

The polyimide resin composition of the present invention is a polyimide resin composition containing a polyimide resin (A) and a nanocarbon material (B), wherein the polyimide resin (A) contains a repeating structural unit represented by the following formula (1) and a repeating structural unit represented by the following formula (2), and a content ratio of the repeating structural unit of the formula (1) with respect to the total of the repeating structural unit of the formula (1) and the repeating structural unit of the formula (2) is 20 to 70 mol %:

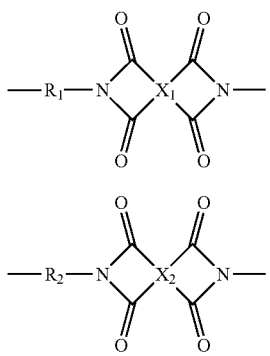

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic group.

4

According to the polyimide resin composition of the present invention, a molded article having excellent long-term heat resistance and high blackness can be provided.

<Polyimide Resin (A)>

The polyimide resin (A) used in the present invention contains a repeating structural unit represented by the following formula (1) and a repeating structural unit represented by the following formula (2), and a content ratio of the repeating structural unit of the formula (1) with respect to the total of the repeating structural unit of the formula (1) and the repeating structural unit of the formula (2) is 20 to 70 mol %:

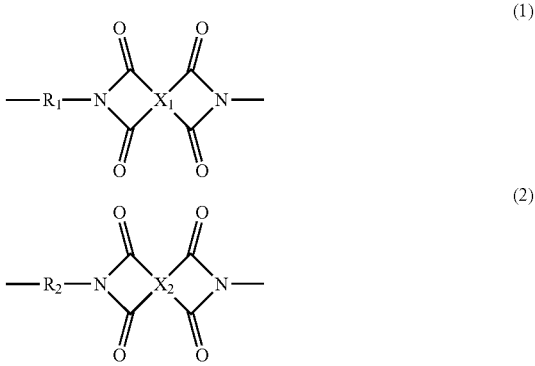

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic group.

The polyimide resin (A) used in the present invention is a thermoplastic resin, which is preferably in a powder or pellet form. The thermoplastic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

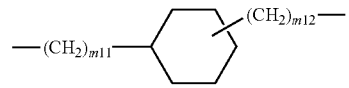
(R1-1)

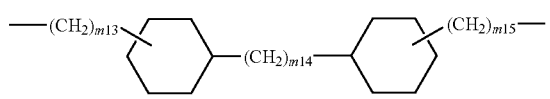
(R1-2)

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

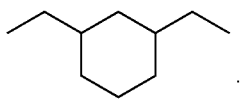
(R1-3)

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4);

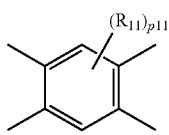
(X-1)

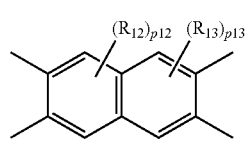
(X-2)

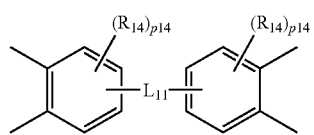
(X-3)

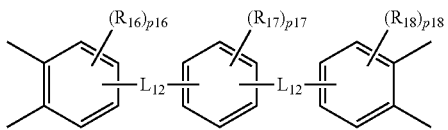
(X-4)

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$, and $p_{13}$ in the formula (X-2) are selected in such a manner that the tetravalent group represented by the formula (X-2) has from 10 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

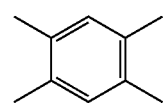
(X-5)

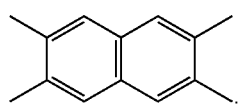
(X-6)

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

(R2-1)

(R2-2)

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less from the viewpoint of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the content ratio falls within this range, the crystallinity of the polyimide resin (A) increases, and thus, a resin composition superior in heat resistance can be obtained.

The content ratio described above is preferably 25 mol % or more, more preferably 30 mol % or more, further preferably 32 mol % or more from the viewpoint of molding processability, and is further preferably 35 mol % or less from the viewpoint of exerting high crystallinity.

The content ratio of the total of the repeating structural unit of the formula (1) and the repeating structural unit of the formula (2) with respect to the total repeating structural units constituting the polyimide resin (A) is preferably 50 to 100 mol %, more preferably 75 to 100 mol %, further preferably 80 to 100 mol %, and still further preferably 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

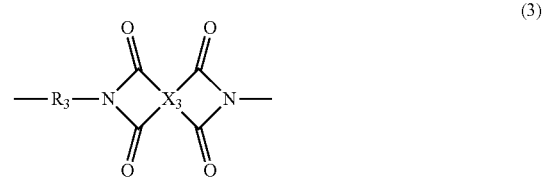
(3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., —C(CF$_3$)$_2$— and —(CF$_2$)$_p$— (wherein p is an integer of 1-10)), as well as —CO—, —SO$_2$—, —SO—, —CONH—, and —COO—.

$R_3$ is preferably a divalent group represented by the following formula (R3-1) or (R3-2):

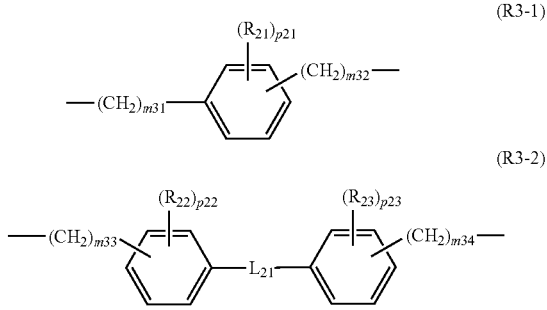

(R3-1)

(R3-2)

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin (A) may further contain a repeating structural unit represented by the following formula (4):

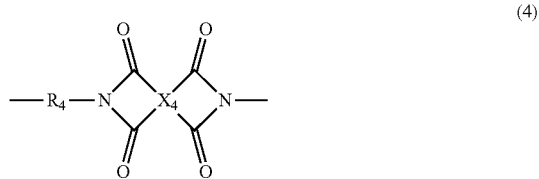

(4)

wherein $R_4$ represents a divalent group containing —$SO_2$— or —$Si(R_x)(R_y)O$—; $R_x$ and $R_y$ each independently represent a chain aliphatic group having from 1 to 3 carbon atoms, or a phenyl group; and $X_1$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin (A) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A) contains the above particular group at the end thereof, it is possible to obtain a resin composition excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms from the viewpoint of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A) preferably contains only a chain aliphatic group having from 5 to 14 carbon atoms, besides a terminal amino group and a terminal carboxy group, at the end thereof from the viewpoint of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A) is preferably 0.01 mol % or more, more preferably 0.1 mol % or more, and further preferably 0.2 mol % or more based on the total 100 mol % of the total repeating structural units constituting the polyimide resin (A) from the viewpoint of exerting excellent heat aging resistance. In order that a sufficient molecular weight is ensured and good mechanical properties are achieved, the content of the chain aliphatic group having from 5 to 14 carbon atoms in the polyimide resin (A) is preferably 10 mol % or less, more preferably 6 mol % or less and further preferably 3.5 mol % or less based on the total 100 mol % of the total repeating structural units constituting the polyimide resin (A).

The content of the chain aliphatic group having from 5 to 14 carbon atoms in the polyimide resin (A) can be determined by depolymerization of the polyimide resin (A).

The polyimide resin (A) preferably has a melting point of 360° C. or less and a glass transition temperature of 150° C. or more. The melting point of the polyimide resin (A) is more preferably 280° C. or more and further preferably 290° C. or more from the viewpoint of heat resistance, and is preferably 345° C. or less, more preferably 340° C. or less, and further preferably 335° C. or less from the viewpoint of exerting high molding processability. In addition, the glass transition temperature of the polyimide resin (A) is more preferably 160° C. or more and more preferably 170° C. or more from the viewpoint of heat resistance, and is preferably 250° C. or less, more preferably 230° C. or less, and further preferably 200° C. or less from the viewpoint of exerting high molding processability.

Both the melting point and the glass transition temperature of the polyimide resin (A) can be measured by a differential scanning calorimeter.

In addition, in the polyimide resin (A), the exothermic amount (hereinafter, also simply referred to as "exothermic amount of crystallization") of the crystallization exothermic peak observed in melting and then cooling of the polyimide resin (A) at a cooling rate of 20° C./min with differential scanning calorimetric measurement is preferably 5.0 mJ/mg or more, more preferably 10.0 mJ/mg or more, and further preferably 17.0 mJ/mg or more from the viewpoint of enhancement of crystallinity, heat resistance, mechanical strength, and chemical resistance. The upper limit of the exothermic amount of crystallization of the polyimide resin (A) is not particularly limited, and is usually 45.0 mJ/mg or less.

Specifically, the melting point, the glass transition temperature, and the exothermic amount of crystallization of the polyimide resin (A) can be measured by the methods described in Examples.

The logarithmic viscosity of the polyimide resin (A) at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the polyimide resin composition obtained has sufficient mechanical strength, and when the logarithmic viscosity is 2.0 dL/g or less, molding processability and handleability are good. The logarithmic viscosity $\mu$ is obtained according to the following expression by measuring the elapsed times for flowing concentrated sulfuric acid and the polyimide resin solution at 30° C. with a Cannon-Fenske viscometer.

$$\mu = \ln(t_s/t_0)/C$$

$t_0$: elapsed time for flowing concentrated sulfuric acid
$t_s$: elapsed time for flowing polyimide resin solution
$C$: 0.5 (g/dL)

The weight average molecular weight Mw of the polyimide resin (A) is preferably in the range of 10,000 to 150,000, more preferably 15,000 to 100,000, further preferably 20,000 to 80,000, still further preferably 30,000 to 70,000, and still further preferably 35,000 to 65,000. When the weight average molecular weight Mw of the polyimide resin (A) is 10,000 or more, the mechanical strength is good, and when the Mw is 150,000 or less, the molding processability is good.

The weight average molecular weight Mw of the polyimide resin (A) can be measured by a gel permeation chromatography (GPC) method using polymethyl methacrylate (PMMA) as a standard sample.

(Method for Producing Polyimide Resin (A))

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate, and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane, and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less from the viewpoint of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

In addition, the molar ratio is preferably 12 mol % or less, more preferably 10 mol % or less, further preferably 5 mol % or less and still more preferably 0 mol % from the viewpoint of a decrease in coloration of the polyimide resin (A).

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably at least one selected from the group consisting of a monoamine compound and a dicarboxylic acid compound. The amount of the end capping agent to be used may be any amount as long as a desired amount of an end group can be introduced into the polyimide resin (A), and the amount is preferably 0.0001 to 0.1 mol, more preferably 0.001 to 0.06 mol, and further preferably 0.002 to 0.035 mol, per 1 mol of the tetracarboxylic acid and/or the derivative thereof.

Among these, the monoamine end capping agent is preferable as the end capping agent, and a monoamine containing a chain aliphatic group having from 5 to 14 carbon atoms is more preferable and a monoamine containing a saturated linear aliphatic group having from 5 to 14 carbon atoms is further preferable from the viewpoint of introduction of the chain aliphatic group having from 5 to 14 carbon atoms into the end of the polyimide resin (A) for enhancement of heat aging resistance.

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the polyimide resin (A), a known polymerization method may be applied, and the method described in WO2016/147996 may be employed.

<Nanocarbon Material (B)>

The polyimide resin composition of the present invention contains the above-described polyimide resin (A) and nanocarbon material (B).

According to the polyimide resin composition of the present invention, a molded article having excellent long-term heat resistance and high blackness can be provided.

The blackness is evaluated with the lightness (L value), which is measured using a colorimeter by reflectometry. When the L value is less than 20 herein, the blackness can be evaluated to be high.

The lightness (L value) of the polyimide resin composition can be specifically measured by the method described in Examples.

The detailed mechanism of the effect achieved by the present invention is not clarified, but it is assumed that an oxygen barrier effect is exerted because the nanocarbon material (B) has a sheet-like graphene structure in which carbon atoms are rigidly covalently bonded to one another in a honeycomb shape. According to a molded article produced with the polyimide resin composition containing the nanocarbon material (B) having this sheet-like graphene structure, it is assumed that oxygen degradation is unlikely to occur on the surface of the molded article for a long period and thus, a molded article having excellent long-term heat resistance and high blackness can be provided.

The term "nanocarbon material (B)" herein refers to a material comprising a structure having a size (thickness) of 0.1 to 1000 nm or a material comprising a structural unit having a size (thickness) of 0.1 to 1000 nm, among materials based on the sheet-like graphene structure in which carbon atoms are rigidly covalently bonded to one another in a honeycomb shape.

The size (thickness) of the nanocarbon material (B) is preferably 0.1 to 900 nm, more preferably 0.1 to 800 nm, and further preferably 0.1 to 700 nm because a molded article having excellent long-term heat resistance and high blackness is easily provided.

Examples of the nanocarbon material (B) include carbon nanotubes, carbon nanohorns, fullerene, and graphene. Among these nanocarbon materials (B), at least one selected from the group consisting of graphene and carbon nanotubes is preferred and graphene is further preferred because a molded article having excellent long-term heat resistance and high blackness is easily provided.

The nanocarbon materials (B) each be used alone or can be used in combinations of two or more thereof.

In the case of carbon nanotubes, carbon nanohorns, fullerene, or the like, when the smallest diameter length of primary particles is in the range of 0.1 to 1000 nm, secondary particles, which are formed of a plurality of primary particles aggregated, are also included in the nanocarbon materials (B).

The term "primary particle" herein refers to a particle generated by growth of a single crystal nucleus.

(Graphene)

In the case of graphene, when the thickness is in the range of 0.1 to 1000 nm, the graphene is included in the nanocarbon materials (B).

The thickness of the graphene is preferably 0.1 to 100 nm, more preferably 0.1 to 50 nm, and further preferably 0.1 to 10 nm because a molded article having excellent long-term heat resistance and high blackness is easily provided.

The term "thickness" referred to herein refers to the thickness of a single layer when the graphene is single-layered and refers to the thickness of the entire layer when the graphene is multi-layered.

The thickness of the graphene can be measured with, for example, a medium-sized probe microscope system ("AFM5500M" produced by Hitachi High-Technologies Corporation).

The graphene, which consists of a sheet-like single-layered or multi-layered structure and from which a molded article having excellent long-term heat resistance and high blackness is easily provided, is preferably at least one selected from the group consisting of single-layered, 2 to 9-layered, and 10 to 25-layered structures.

Further, the graphene is highly effective for providing a molded article having excellent long-term heat resistance and high blackness, and thus, the graphene consisting of a single-layered structure is more preferred.

The specific surface area of the graphene is preferably 50 to 800 $m^2/g$, more preferably 100 to 700 $m^2/g$, and further preferably 200 to 600 $m^2/g$ because a molded article having excellent long-term heat resistance and high blackness is easily provided.

The specific surface area of the graphene can be determined by the BET method.

The graphene may contain oxygen.

The oxygen content of the graphene is preferably 3 to 40 atomic weight %, more preferably 5 to 30 atomic weight %, and further preferably 10 to 20 atomic weight % based on the total graphene atomic weight (100 atomic weight %) because a molded article having excellent long-term heat resistance and high blackness is easily provided.

The content of the nanocarbon material (B) in the polyimide resin composition is preferably 0.05 to 10 mass %, more preferably 0.05 to 8 mass %, further preferably 0.07 to 5 mass %, further preferably 0.07 to 3 mass %, further preferably 0.09 to 3 mass %, and further preferably 0.5 to 3 mass % because a molded article having excellent long-term heat resistance and high blackness is easily provided. The upper limit of the content of the nanocarbon material (B) in the polyimide resin composition is preferably 4 mass % or less and more preferably 3 mass % or less from the viewpoint of easily obtaining a molded article having excellent glossiness. The lower limit of the content of the nanocarbon material (B) in the polyimide resin composition is preferably 0.15 mass % or more and more preferably 0.3 mass % or more from the viewpoint of easily obtaining a molded article having excellent long-term heat resistance.

The nanocarbon material (B) may be produced by a known method. Alternatively, commercially available graphene may be used as the nanocarbon material (B). Examples of commercially available graphene include "N002-PD", "N002-PDE", "N002-PDR", "N006-P", and "N008" produced by ISHIHARA CHEMICAL CO., LTD.

<Additive>

In the polyimide resin composition of the present invention, additives may be mixed as required, such as a filler, a delusterant, a nucleating agent, a plasticizer, an antistatic agent, an anti-coloring agent, an anti-gelling agent, a colorant, a slidability-improving agent, an antioxidant, a conducting agent, and a resin-modifying agent.

The amount of the above additive mixed is not particularly limited, and usually 50 mass % or less, preferably 0.0001 to 30 mass %, more preferably 0.001 to 15 mass %, and further preferably 0.01 to 10 mass % in the polyimide resin composition from the viewpoint of expressing the effect of the additive while maintaining the physical properties derived from the polyimide resin (A).

Another resin other than the polyimide resin (A) may also be mixed in the polyimide resin composition of the present invention, without impairing the characteristics of the composition. Such another resin is preferably a high heat resistant thermoplastic resin, and examples thereof include a polyamide resin, a polyester resin, a polyimide resin other than the polyimide resin (A), a polycarbonate resin, a polyetherimide resin, a polyamideimide resin, a polyphenylene ether imide resin, a polyphenylene sulfide resin, a polysulfone resin, a polyethersulfone resin, a polyallylate resin, a liquid crystal polymer, a polyether ether ketone resin, a polyether ketone resin, a polyether ketone ketone resin, a polyether ether ketone ketone resin, and a polybenzoimidazole resin. Among these, one or more selected from the group consisting of a polyether imide resin, a polyphenylene sulfide resin, and a polyether ether ketone resin are preferable from the viewpoint of heat resistance, molding processability, strength and solvent resistance.

When the polyimide resin (A) is used in combination with another resin, the rate of such another resin to be mixed is not particularly limited, without impairing the characteristics of the polyimide resin composition.

However, the total content of the polyimide resin (A) and the nanocarbon material (B) in the polyimide resin composition of the present invention is preferably 50 mass % or more, more preferably 70 mass % or more, and further preferably 80 mass % or more from the viewpoint of achievement of the effect of the present invention. The upper limit thereof is 100 mass %.

The polyimide resin composition of the present invention may have any form but is preferably pellets.

The polyimide resin composition of the present invention and the polyimide resin (A) to be used therefor have thermoplasticity. Thus, for example, the polyimide resin (A), the nanocarbon material (B), and various arbitrary components, if necessary, are added and dry blended. Thereafter, the resulting mixture is melt-kneaded in an extruder, the melt-kneaded product is extruded into a strand, and the strand can be cut into pellets. The pellets are introduced in various kinds of molding machines and heat-molded by a method described below, thereby being easily produced into a molded article having a desired shape.

[Molded Article]

The present invention provides a molded article including the polyimide resin composition.

Since the polyimide resin composition of the present invention has thermoplasticity, the molded article of the present invention can be easily produced also by heat-molding the polyimide resin composition. Examples of the heat molding method include injection molding, extrusion molding, blow molding, heat press molding, vacuum molding, pneumatic molding, laser molding, welding, and heat adhesion, and the polyimide resin composition of the present invention may be molded by any molding method that includes a heat melting step. Among these, injection molding is preferably performed because such molding can be performed without the molding temperature and the mold temperature in molding being set at high temperatures. For example, injection molding can be performed at a molding temperature of 360° C. or less and a mold temperature of 220° C. or less.

The method for producing a molded article preferably includes the step of heat-molding the polyimide resin composition at from 290 to 350° C. Examples of specific procedures include the following method.

First, the nanocarbon material (B) and various arbitrary components, if necessary, are added to the polyimide resin (A) and dry blended, and thereafter the resulting mixture is introduced into an extruder, and molten preferably at from 290 to 350° C. The molten product is melt-kneaded in the extruder and extruded, thereby producing pellets. Alternatively, the polyimide resin (A) may be introduced into an extruder and molten preferably at from preferably 290 to 350° C., and the nanocarbon material (B) and various arbitrary components may be introduced thereto, melt-kneaded with polyimide resin (A) in the extruder, and extruded, thereby producing the pellets.

The pellets may be dried, then introduced in various kinds of molding machines, and heat-molded preferably at from 290 to 350° C., thereby producing a molded article having a desired shape.

Since the polyimide resin composition of the present invention may be heat-molded by extrusion molding or the like at a relatively low temperature of from 290 to 350° C., the polyimide resin composition is excellent in molding processability and may be easily produced into a molded product having a desired shape. The temperature of the heat molding is preferably from 310 to 350° C.

The polyimide resin composition of the present invention, which has excellent long-term heat resistance and from which a molded article having high blackness can be obtained, can be applied, for example, in various industrial members, members for household electrical products such as gears, bearings, and belts, covering materials for electrical wire and the like, cover-lay films, aviation applications, enclosures for electric appliances, interior members for automobiles, exterior members for automobiles, members for use in furniture, and members for use in musical instruments.

EXAMPLES

The present invention will be described in more detail with reference to examples below, but the present invention is not limited thereto. Various measurements and evaluations in each Production Example, Example, and Comparative Example were carried out in the following manners.

<Infrared Spectroscopy (IR Measurement)>

The IR measurement of the polyimide resin was performed with "JIR-WINSPEC 50", produced by JEOL, Ltd.

<Logarithmic Viscosity μ>

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity μ was obtained according to the following expression.

$$\mu = \ln(t_s/t_0)/C$$

$t_0$: elapsed time for flowing concentrated sulfuric acid
$t_s$: elapsed time for flowing polyimide resin solution
C: 0.5 g/dL <Melting Point, Glass Transition Temperature, Crystallization Temperature, and Exothermic Amount of Crystallization>

The melting point (Tm), the glass transition temperature (Tg), the crystallization temperature (Tc) and the exothermic amount of crystallization (ΔHm) of the polyimide resin were measured with a differential scanning calorimeter ("DSC-6220", produced by SII Nanotechnology, Inc.).

The polyimide resin was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point (Tm) was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

<Crystallization Half-Time>

The crystallization half-time of the polyimide resin was measured with a differential scanning calorimeter ("DSC-6220", produced by SII Nanotechnology, Inc.).

Under a nitrogen atmosphere, a polyimide resin was held at 420° C. for 10 minutes for melting the polyimide resin completely and then quenched at a cooling rate of 70° C./min, during which the time required from the appearance of the crystallization peak observed to the peak top thereof was calculated. In Table 1, the case where the crystallization half-time was 20 seconds or less was denoted by "<20".

<Weight Average Molecular Weight>

The weight average molecular weight (Mw) of the polyimide resin was measured with a gel permeation chromatography (GPC) measurement apparatus "Shodex GPC-101" produced by Showa Denko K.K. under the following conditions:

Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %
Detector: IR detector
Amount of injection: 100 μm
Calibration curve: standard PMMA <Lab Value and YI Value>

The Lab value and the YI value of the pellets of the polyimide resin composition obtained in each of Examples were measured with a colorimeter ("ZE2000" produced by NIPPON DENSHOKU INDUSTRIES CO., LTD.) by reflectometry.

Here, L represents the lightness, and a larger value means higher whiteness while a smaller value means higher blackness. a represents the degree of red-green, and a larger value means stronger redness while a smaller value means stronger greenishness. b represents the degree of yellow-blue, and a larger value means stronger yellowishness while a smaller value means stronger bluishness. YI represents the yellow index, and a smaller value means weaker yellowishness and a better hue.

The L value was evaluated in accordance with the following criteria.
A: When the L value is less than 20, blackness is high.
B: When the L value is 20 or more, blackness is low.

<Relative Permittivity and Dielectric Loss Tangent>

The pellets of the polyimide resin composition obtained in each of Examples were used to prepare a molded article of 80 mm×10 mm×4 mm in thickness prescribed in ISO 316, which was used for measurement as a specimen. The permittivity and the dielectric loss tangent were measured with Impedance Analyzer ("4294A" produced by Agilent Ltd.) at room temperature (23° C.) and 10 GHz.

<Glossiness>

The pellets of the polyimide resin composition obtained in each of Examples were used to prepare a molded article of 80 mm×10 mm×4 mm in thickness prescribed in ISO 316, which was used for measurement as a specimen. The 60° glossiness (incident angle: 60°, light-receiving angle: 60°) was measured with a gloss meter ("VG-2000" produced by NIPPON DENSHOKU INDUSTRIES CO., LTD.) according to JIS K5101-5-3:2004.

The 60° glossiness was evaluated in accordance with the following criteria.
A: The 60° glossiness value is 60 GU or more.
B: The 60° glossiness value is less than 60 GU.

<Bending Strength and Flexural Modulus>

The pellets of the polyimide resin composition obtained in each of Examples were used to prepare a molded article of 80 mm×10 mm×4 mm in thickness prescribed in ISO 316, which was used for measurement as a specimen. The bending test was performed with Bend Graph (produced by Toyo Seiki Seisaku-Sho, Ltd.) according to ISO 178 at room temperature (23° C.) and a testing speed of 2 mm/min to measure the flexural modulus (GPa) and the bending strength (MPa).

The bending strength of the specimen before subjected to a long-term heat resistance test was taken as "X".

<Long-Term Heat Resistance Test>

The pellets of the polyimide resin composition obtained in each of Examples was used to prepare six molded articles of 80 mm×10 mm×4 mm in thickness prescribed in ISO 316. Three of the six molded articles as first specimens and the other three as second specimens were heat aged as follows.

The three first specimens were each introduced in Forced Convection Constant Temperature Oven ("DN610" produced by Yamato Scientific Co., Ltd.) and left to stand at 200° C. for 7 days (168 h) for heat aging.

The three second specimens were each introduced in the Forced Convection Constant Temperature Oven in the same manner as the first specimens and left to stand at 170° C. for 42 days (1008 h) for heat aging.

(Flexural Modulus and Bending Strength)

The above heat aged three first specimens and three second specimens were each subjected to a bending test was with Bend Graph (produced by Toyo Seiki Seisaku-Sho, Ltd.) according to ISO 178 at room temperature (23° C.) and a testing speed of 2 mm/min to measure the flexural modulus (GPa) and the bending strength (MPa).

The average value of the bending strength of the three first specimens measured after the heat aging at 200° C. (7 days (168 h)) was taken as "$Y_1$".

The average value of the bending strength of the three second specimens measured after the heat aging at 170° C. (42 days (1008 h)) was taken as "$Y_2$".

(Bending Strength Retention at 200° C.)

The bending strength retention (%) of the first specimens after the heat aging at 200° C. (7 days (168 h)) was calculated by the following expression 1.

$$(Y_1/X) \times 100 (\%) \qquad \text{Expression 1:}$$

The bending strength retention value of the specimens after the heat aging test at 200° C. was evaluated in accordance with the following criteria.
A: The bending strength retention is 70% or more.
B: The bending strength retention is 50% or more and less than 70%.
C: The bending strength retention is 40% or more and less than 50%.
D: The bending strength retention is less than 40%.

(Bending Strength Retention at 170° C.)

The bending strength retention (%) of the second specimens after the heat aging at 170° C. (42 days (1008 h)) was calculated by the following expression 2.

$$(Y_2/X) \times 100 (\%) \qquad \text{Expression 2:}$$

The bending strength retention value of the specimens after the heat aging test at 170° C. was evaluated in accordance with the following criteria.
A: The bending strength retention is 80% or more.
B: The bending strength retention is 70% or more and less than 80%.
C: The bending strength retention is 50% or more and less than 70%.
D: The bending strength retention is less than 50%.

[Production Example 1] Production of Polyimide Resin 1

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl)cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy)ethanol with a 500 mL beaker, thereby preparing a mixed diamine solution. This mixed diamine solution was added into the suspended solution gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.010 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy) ethanol and 300 g of methanol, filtered, and then dried at 180° C. for 10 hours with a drier, thereby providing 317 g of a powder of polyimide resin 1.

The measurement of the IR spectrum of polyimide resin 1 showed the characteristic absorption of an imide ring $v(C=O)$ observed at 1768 and 1697 (cm$^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

The composition and evaluation results of the polyimide resin in Production Example 1 are shown in Table 1. The values expressed in mol % of the tetracarboxylic acid component and the diamine component in Table 1 are values calculated from the charged amount of each component in production of the polyimide resin.

TABLE 1

| | Tetracarboxylic acid component (mol % in total tetracarboxylic acid components) | Diamine component (mol % in total diamine components) | | (1)/{(1) + (2)} | Tm | Tg | Tc | Exothermic amount of crystallization ΔHm | Crystallization half-time | |
|---|---|---|---|---|---|---|---|---|---|---|
| | PMDA | 1,3-BAC | OMDA | (mol %)*1 | (° C.) | (° C.) | (° C.) | (mJ/mg) | (seconds) | Mw |
| Production Example 1  Polyimide resin 1 | 100 | 35 | 65 | 35 | 323 | 184 | 266 | 21.0 | <20 | 55,000 |

*1 The content ratio of the repeating structural unit of the formula (1) (mol %) with respect to the total of the repeating structural unit of the formula (1) and the repeating structural unit of the formula (2) in the polyimide resin 1

Abbreviations in the Table 1 are as follows.
PMDA; pyromellitic dianhydride
1,3-BAC; 1,3-bis(aminomethyl)cyclohexane
OMDA; 1,8-octamethylenediamine Examples 1 to 5 and Comparative Examples 1 to 3

The polyimide resin 1 obtained in Production Example 1 and the nanocarbon material (B) or other carbon material shown in Table 2 in the rate of the resin and the material to be mixed shown in Table 2 were sufficiently mixed by dry blend. The resulting mixed powder was extruded into a strand at a barrel temperature of 350° C. and a screw rotation speed of 70 rpm with Labo Plastomill (produced by Toyo Seiki Seisaku-Sho, Ltd.). The strand extruded from the extruder was cooled in air, then pelletized by cutting with a pelletizer ("Fan Cutter FC-Mini-4/N", produced by Hoshi Plastic Co., Ltd.), and dried at 190° C. for 10 hours, thereby providing pellets of the polyimide resin composition.

The pellets of the polyimide resin composition had a length of 3 to 4 mm and a diameter of 2 to 3 mm.

The obtained pellets were used to perform various evaluations according to the aforementioned methods, and the results thereof are shown in Table 2.

TABLE 2

| | | Example | | | | | Comparative Example | | |
|---|---|---|---|---|---|---|---|---|---|
| | | 1 | 2 | 3 | 4 | 5 | 1 | 2 | 3 |
| Blend of polyimide resin composition (mass %) | | | | | | | | | |
| (A) | (A1) Polyimide resin 1 | 99 | 99.9 | 99 | 98 | 95 | 100 | 99 | 99 |
| (B) | B1) N002-PDE single-layered graphene oxide | 1 | — | — | — | — | — | — | — |
| | (B2) N002-PDR single-layered graphene | — | 0.1 | 1 | 2 | 5 | — | — | — |
| Carbon material other than (B) | (b1) UP-5N flake graphite powder | — | — | — | — | — | — | 1 | — |
| | (b2) CGC-20 spheroidized graphite powder | — | — | — | — | — | — | — | 1 |

TABLE 2-continued

|  |  |  | Example | | | | | Comparative Example | | |
|---|---|---|---|---|---|---|---|---|---|---|
|  |  |  | 1 | 2 | 3 | 4 | 5 | 1 | 2 | 3 |
| Measurement results of basic physical property test | | | | | | | | | | |
| Hue | L | — | 16.01 | 17.19 | 16.72 | 16.8 | 17.9 | 48.06 | 21.62 | 21.83 |
|  | a | — | −0.15 | −0.29 | −0.08 | 0.01 | 0.00 | 6.26 | −0.21 | 0.23 |
|  | b | — | −0.28 | −0.5 | −0.45 | −0.3 | 0.41 | 17.79 | 0.68 | 0.33 |
|  | YI | — | −3.53 | −6.18 | −4.93 | −3.2 | 4.24 | 75.82 | 5.18 | 3.66 |
|  | Evaluation of L | — | A | A | A | A | A | B | B | B |
| Optical properties | 60° glossiness | GU | 75.3 | 82.3 | 75.3 | 63.5 | 16.3 | 99.9 | 66.0 | 80.4 |
|  | Evaluation at 60° glossiness | — | A | A | A | A | B | A | A | A |
| Conductive properties | Relative permittivity $\varepsilon_r$ (10 GHz) | — | 3.42 | — | — | — | — | 2.66 | 3.34 | 3.28 |
|  | Dielectric loss tangent $\tan\delta$ (10 GHz) | — | 0.0721 | — | — | — | — | 0.0039 | 0.00497 | 0.00496 |
| Mechanical properties | Flexural modulus | GPa | 2.5 | 2.5 | 2.6 | 3.0 | 3.5 | 2.4 | 3.8 | 3.9 |
|  | Bending strength X | MPa | 117 | 114 | 117 | 123 | 115 | 120 | 117 | 117 |
| Measurement results of long-term heat resistance test at 200° C. | | | | | | | | | | |
| After 7 days (168 h) | Flexural modulus | GPa | 2.6 | 2.7 | 2.7 | 3.1 | 3.5 | 2.7 | 2.9 | 2.8 |
|  | Bending strength $Y_1$ | MPa | 100 | 49 | 75 | 74 | 77 | 35 | 35 | 42 |
|  | Bending strength retention $(Y_1/X)*100$ | % | 86 | 42 | 64 | 60 | 67 | 29 | 30 | 36 |
|  | Evaluation of bending strength retention | — | A | C | B | B | B | D | D | D |
| Evaluation results of long-term heat resistance at 170° C. | | | | | | | | | | |
| After 42 days (1008 h) | Flexural modulus | GPa | 2.6 | 2.7 | 2.7 | 3.0 | 3.5 | 2.5 | 3.1 | 2.8 |
|  | Bending strength $Y_2$ | MPa | 128 | 95 | 114 | 122 | 115 | 55 | 75 | 66 |
|  | Bending strength retention $(Y_2/X)*100$ | % | 110 | 83 | 97 | 99 | 100 | 46 | 64 | 57 |
|  | Evaluation of bending strength retention | — | A | A | A | A | A | D | C | C |

The details of each component shown in Table 2 are as follows.

<Polyimide Resin (A)>

(A1) Polyimide resin 1 obtained in Production Example 1, Mw: 55,000

<Nanocarbon Material (B)>

(B1) N002-PDE: single-layered graphene oxide, produced by ISHIHARA CHEMICAL CO., LTD., thickness: less than 1 nm, oxygen content: 10 to 20 atomic weight %, specific surface area: 400 m$^2$/g (B2) N002-PDR: single-layered graphene, produced by ISHIHARA CHEMICAL CO., LTD., thickness: less than 1 nm, specific surface area: 400 m$^2$/g <Carbon Material Other than (B)>

(b1) UP-5N: flake graphite powder, produced by Nippon Graphite Industries, Ltd., average particle size: 5 μm, apparent density: 0.1 g/cm$^3$ (b2) CGC-20: spheroidized graphite powder, produced by Nippon Graphite Industries, Ltd., average particle size: 20 μm, apparent density: 0.45 g/cm$^3$, specific surface area 4.5 m$^2$/g The evaluation results described in Table 2 indicate the following.

The polyimide resin compositions of Comparative Examples 1 to 3 contained no nanocarbon material (B). For this reason, the resulting molded articles had insufficient long-term heat resistance.

On the other hand, the polyimide resin compositions of Examples 1 to 5 contained the particular polyimide resin (A) and the nanocarbon material (B). For this reason, the resulting molded articles were superior in long-term heat resistance than those resulted from the polyimide resin compositions of Comparative Examples 1 to 3.

The molded articles resulted from the polyimide resin compositions of Examples 1 to 5 had higher blackness than those resulted from Comparative Examples 2 and 3, which contained graphite powder.

INDUSTRIAL APPLICABILITY

According to the polyimide resin composition of the present invention, a molded article having excellent long-term heat resistance and high blackness can be provided. The molded article of the present invention can be applied, for example, in various industrial members, members for household electrical products such as gears, bearings, and belts, covering materials for electrical wire and the like, cover-lay films, aviation applications, enclosures for electric appliances, interior members for automobiles, exterior members for automobiles, members for use in furniture, and members for use in musical instruments.

The invention claimed is:

1. A thermoplastic polyimide resin composition, comprising:
   a polyimide resin (A); and
   a nanocarbon material (B) comprising graphene and included at a content of from 0.5 to 3 mass % based on a total mass of the polyimide resin composition,
   wherein the polyimide resin (A) comprises a repeating structural unit of the following formula (1) and a repeating structural unit of the following formula (2),

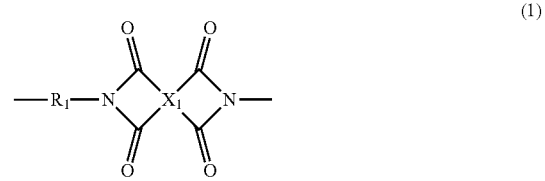

(1)

-continued

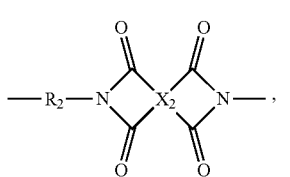
(2)

wherein $R_1$ represents a divalent group of the formula (R1-3),
$R_2$ is at least one selected from the group consisting of an octamethylene group and a decamethylene group,
$X_1$ and $X_2$ each represents a tetravalent group of the formula (X-5),

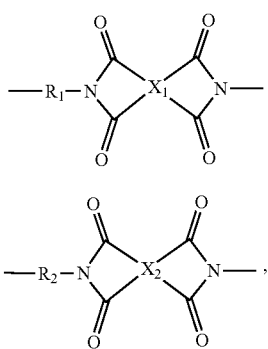

a content ratio of the repeating structural unit of the formula (1) with respect to a total of the repeating structural unit of the formula (1) and the repeating structural unit of the formula (2) is from 20 mol % to less than 40 mol %, the polyimide resin (A) is a thermoplastic polyimide resin,
the polyimide resin (A) has a weight average molecular weight (Mw) of from 15,000 to 100,000,
the graphene comprises at least one selected from the group consisting of a single-layered structure, a 2 to 9-layered structure, and a 10 to 25-layered structure,
the graphene has a thickness of from 0.1 to 100 nm,
the graphene has a specific surface area of from 50 m2/g to 800 m2/g, and
a total content of the polyimide resin (A) and the nanocarbon material (B) in the thermoplastic polyimide resin composition is at least 70 mass %.

2. The polyimide resin composition of claim 1, wherein the graphene comprises from 3 to 40 atomic weight % of oxygen based on a total atomic weight of the graphene.

3. A molded article, comprising:
the polyimide resin composition of claim 1.

4. The polyimide resin composition of claim 1, wherein a total content of the polyimide resin (A) and the nanocarbon material (B) in the polyimide resin composition is at least 80 mass %.

5. The polyimide resin composition of claim 1, the graphene comprises a single-layered structure.

6. The polyimide resin composition of claim 4, the graphene comprises a single-layered structure.

7. The polyimide resin composition of claim 1, wherein the graphene has the thickness of from 0.1 to 10 nm.

8. The polyimide resin composition of claim 1, wherein the graphene has the specific surface area of from 200 m2/g to 600 m2/g.

9. The polyimide resin composition of claim 1, having a lightness L value of less than 20 measured by a colorimeter.

10. The polyimide resin composition of claim 1, wherein the graphene has a single-layered structure.

* * * * *